United States Patent [19]

Fahrenholz

[11] 3,782,477
[45] Jan. 1, 1974

[54] ROCK PICKER WITH HIGH LIFT DUMP BOX

[76] Inventor: Harley D. Fahrenholz, Box 278, Clarissa, Minn. 56440

[22] Filed: Mar. 2, 1972

[21] Appl. No.: 231,245

[52] U.S. Cl. .................................. 171/12, 171/92
[51] Int. Cl. ............................................ A01d 17/16
[58] Field of Search ........................... 171/12, 92; 56/DIG. 1; 298/11; 214/508

[56] References Cited
UNITED STATES PATENTS
2,725,700   12/1955   Fahrenholz ........................... 171/12
2,393,732   1/1946    Balbi .................................. 214/508
3,535,860   10/1970   Schwalm et al .................. 56/DIG. 1

*Primary Examiner*—Antonio F. Guida
*Attorney*—Ralph L. Dugger et al.

[57] ABSTRACT

A rock picker utilizing a tumbler member for separating the dirt from the rocks being picked, and including a unitary frame with a storage dump box into which the rocks are delivered mounted on the frame. The rocks can be dumped from the storage box into a truck or the like. The frame is mounted on a support that permits directly raising the frame to a dumping position. The support is made so the support balance line of the rock picker does not shift significantly even when the frame is raised a substantial amount.

7 Claims, 3 Drawing Figures

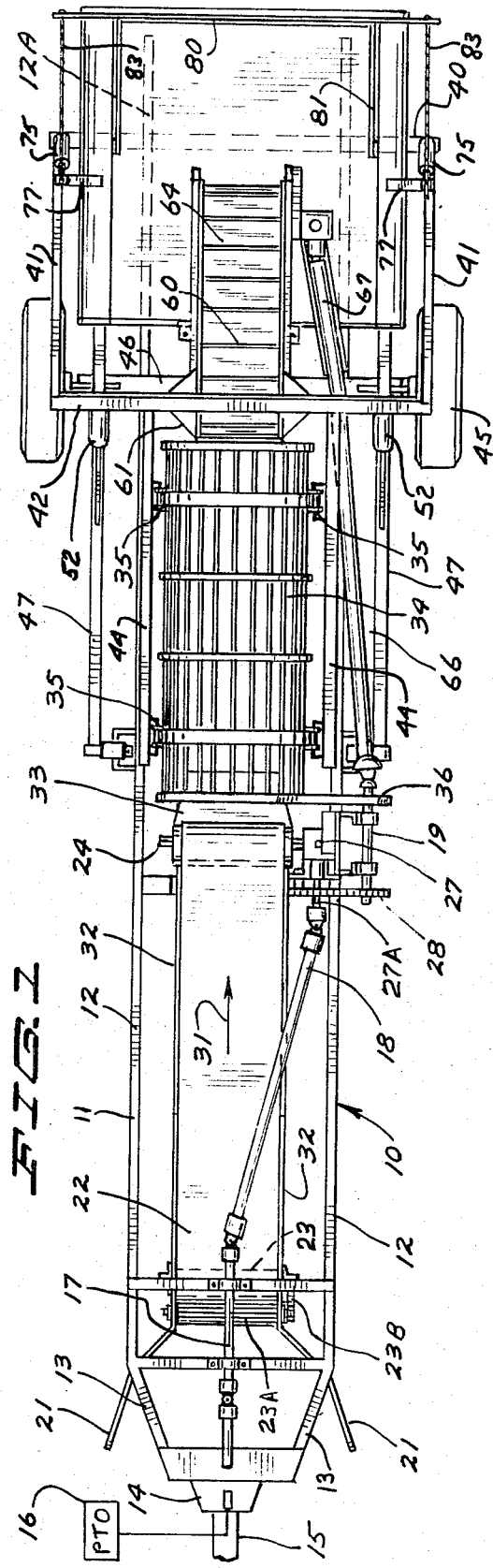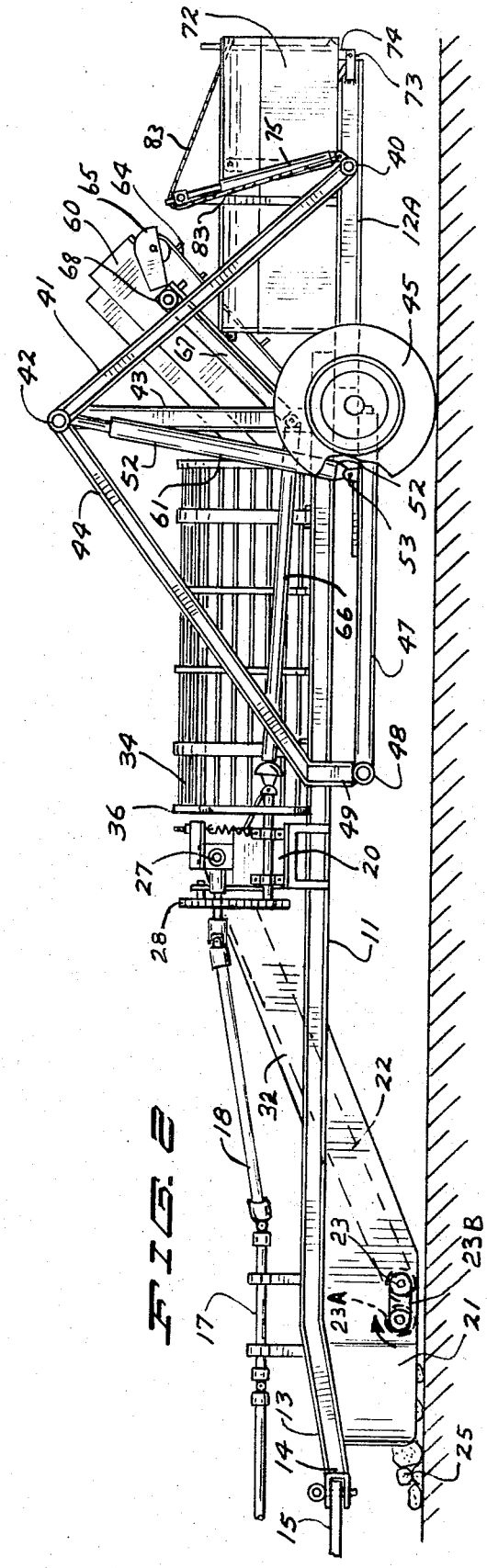

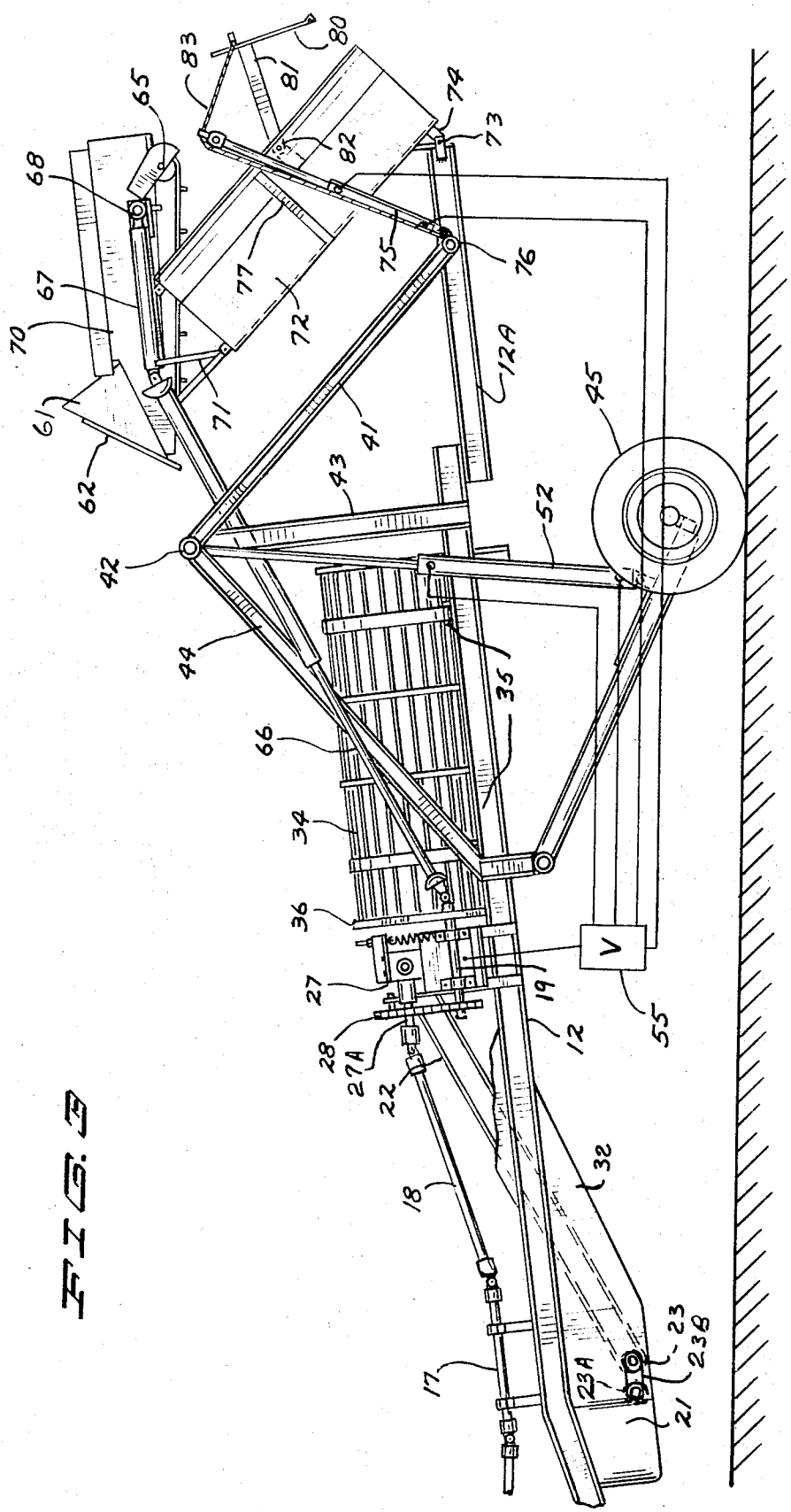

ROCK PICKER WITH HIGH LIFT DUMP BOX

1. Field of the Invention

The present invention relates to rock pickers including dumping boxes in a unitary frame with the rock picker.

2. Prior Art

Various rock pickers have been advanced over the years. For example, my own U.S. Pat. No. 2,725,700 illustrates a rock picker using a conveyor that lifts the rocks into a rock tumbler which is a rotating open slot cage. The device shown in my previous patent has a conveyor for receiving the rocks from the tumbler and elevating them into a trailer which is towed behind the picker.

When the rock picker shown in my previous patent was operated, it became necessary to have separate trailers towed behind the unit where large fields were being picked. The trailers were dumped into trucks, so that an entire truck load of rocks could be hauled to a rock pile at one time.

The rock picker shown in my previous patent operated very well for picking rocks from a windrow or directly from the field, but it was still necessary to have a separate trailer towed behind the picker.

SUMMARY OF THE INVENTION

The present invention relates to a rock picker having a unitary frame on which a storage box is mounted, and which frame can be elevated to a dumping position for dumping the storage box onto a truck bed or other elevated platform. The storage box is also pivotally mounted for dumping. A short conveyor for elevating the rocks from the rock tumbler used with the present picker is used for transferring the rocks into the storage box. The conveyor and the storage box pivot as a unit when the storage box is being dumped, so that the conveyor does not interfere with pivotal movement of the storage box.

The present short conveyor receives rocks from the tumbler, and carries them to the storage box. When the storage box is filled, the entire rock picker frame can be lifted a substantial amount so that the end gate of the storage box is a substantial distance above the ground to permit dumping the rocks into a truck bed or body. The lifting mechanism comprises direct acting hydraulic cylinders for positive control. The tilting or dumping action of the storage box is also through direct acting hydraulic cylinders. The lifting mechanism is made so that the support line or balance point from the wheels of the unit does not shift substantially forwardly, thereby eliminating any hazard from high upward loads on the hitch tongue for the frame, and insuring that the lifting and dumping can be safely accomplished.

BRIEF DESCRIPTION OF THE DRAWINGS

FIG. 1 is a top plan view of a rock picker having a dumping box at the rear thereof made according to the present invention;

FIG. 2 is a side elevational view of the device of FIG. 1; and

FIG. 3 is a side elevational view of the device in its dumping position.

DESCRIPTION OF THE PREFERRED EMBODIMENT

Referring to FIG. 1, a rock picker illustrated generally at 10 is of the type generally shown in my U.S. Pat. No. 2,725,700, and can be constructed in the manner shown in that patent. The showing in this application is slightly modified from the showing in my previous patent, and is illustrated only schematically for purposes of illustration. The modified rock picker of the present invention includes a main frame 11 that has a pair of longitudinally extending stringers 12,12 that taper together at a forward end illustrated at 13, and a hitch clevis 14 is attached to this forward end. The hitch clevis or attaching member 14 is adapted to go onto the drawbar 15 of a tractor or other towing vehicle, which has a power take off illustrated schematically at 16, to drive the powered components for the rock picker. As shown, power is transferred back through a shaft 17 mounted on bearings, and through a shaft 18 to a gear box shaft 27A. The shaft 18 is attached between shaft 17 and shaft 27A with a universal joint at each end. A transfer shaft 19 is rotatably mounted in suitable bearings on an upright support 20 attached to one of the side frame members 12, and is driven with a chain and sprocket drive 28 from shaft 27A.

The rock picker, as shown in my previously mentioned U.S. Pat. No. 2,725,700 has a pair of rock guide wings 21,21 at the forward end thereof which will engage rocks on the ground, or in a rock windrow formed in a usual manner, and guide the rocks toward a conveyor member 22. The conveyor member comprises an endless member mounted over a lower roller and shaft 23, and an upper roller and shaft 24. The conveyor can be of any desired configuration, for example a conveyor belt, and the belt can have lugs or members mounted thereon which will aid in carrying the rocks. In addition, a chain and slat conveyor that is positioned above the conveyor 22 may be used in cooperation with the conveyor 22 to provide an additional force for moving the rocks onto the lower end of the conveyor 22.

The conveyor uses a rotating powered roller 23A rotatably mounted ahead of the conveyor belt for picking up rocks which are illustrated at 25 in FIG. 2. The roller has axially extending beads or ribs to lift rocks and is driven with the chain and sprocket 23B from shaft 23. The roller rotates in the direction of the arrow and will pick up the rocks and deposit them on the conveyor 22. The roller 23A replaces the rock pickup blade shown in my previous patent. The conveyor upper shaft 24 is coupled to an output shaft of a gear box 27 that is driven by shaft 18. The drive to the roller 23A thus is through the conveyor belt. The gear box 27 is mounted onto the support 20 and the upper length of the conveyor belt will be moved in direction that is indicated by the arrow 31 to move rocks upwardly along the top of the conveyor. The drive to the conveyor 22 also could be a chain and sprocket drive, if desired. Suitable guide walls 32 are provided for keeping the rocks on the conveyor 22 as the rocks are carried upwardly.

The rocks are then dumped from the upper end of conveyor 22 into the interior of a rotatably mounted rock cleaning tumbler or cage 34. A plate 33 is provided behind the conveyor. The conveyor is running at sufficient speed so that the rocks are thrown about 18 inches into the tumbler. The tumbler 34 is also constructed as shown in my previous mentioned patent. The tumbler comprises a plurality of annular members or rings joined together with a plurality of longitudinally extending rods that are spaced apart. The tumbler is mounted on guide rollers indicated at 35 that are rotatably mounted to the frame, so that these guide rollers 35 will permit the tumbler to rotate about a longitudinal axis. In the present form, the tumbler 34 is rotationally driven about its longitudinal axis through a V-belt drive 36 driven from an opposite end of shaft 19 from the chain and sprocket 28. The belt for the drive 36 drives on a flat steel band around the front end of the tumbler 34 in the form shown, to directly drive the tumbler.

The rods of the tumbler 34 are spaced apart so that dirt and foreign material can drop through the rods, while the rocks will move rearwardly as the tumbler rotates. It can be seen that the tumbler inclines downwardly slightly in rearward direction so that the rocks move toward the rear end of the tumbler.

The side frame members 12,12 of the main frame extend rearwardly beyond the rear end of the tumbler 34, and have additional side members 12A,12A welded thereto and extending further rearwardly. The extra length side members 12A,12A are welded to the bottom surfaces of the side members 12,12 and align therewith. The side members 12A,12A are braced through a framework assembly that includes a cross member 40 joined to the members 12A,12A, and having an upwardly and forwardly extending braces 41 that extend above the rear portions of the tumbler 34 and are connected together with a cross member 42. The cross member 42 is also supported with an upright post 43, connected to the frame member 12. The cross member 42 is also attached to the side members 12,12 with a pair of downwardly and forwardly extending frame supports 44. This overhead frame work greatly strengthens and helps to support the rear frame members 12A,12A. The entire frame 11 is supported for movement over the ground with a pair of wheels 45 that are mounted on suitable spindles attached to a cross axle 46. The axle 46 in turn is attached to a pair of torque or pivot arms 47 that are positioned on opposite sides of frame 11 and are pivotally mounted in hubs 48 extending downwardly from supports 49. The supports 49 are in turn attached to the frame members 12. The torque arms 47 are spaced outwardly from the sides of the frame members 12 in lateral direction. The pivot axis of the torque arms 47 is ahead of the wheels a substantial distance.

The pivotal position of the torque arms 47 and the wheels 45 with respect to the frame is controlled with a pair of direct acting hydraulic cylinders 52. The cylinders each have a cylinder portion attached as at 53 to one of the torque arms 47, and an extendable and retractable rod controlled by an internal piston acting under fluid pressure. The rods are attached in a suitable manner to the cross frame member 42. The cylinders 52 can be controlled through a suitable valve 55 to extend the rods of the cylinders and thereby to lift the rock picker frame relative to the wheels 45 as the torque arms pivot. The cylinders are substantially vertical, and are close to the wheels so the full force of the cylinders is available for lifting force on member 42.

The rocks are dropped from the rear end of the tumbler 34 onto a short conveyor assembly 60. A guide chute 61 which includes a member 62 that fits very closely spaced from the end flange of the tumbler 34, guides the rocks onto the conveyor assembly 60 from the open end of the tumbler.

A conveyor belt 64 for conveyor assembly 60 is mounted over a pair of conveyor mounting rollers, one at the lower end of the conveyor and one at the upper end of the conveyor. The roller at the upper end is driven with a chain and sprocket 65 from a gear box 68. The gear box is driven by a rotatably mounted jack shaft 67 that is mounted alongside the short conveyor. The jack shaft is driven by a telescoping shaft 66 that is connected through universal joints between shaft 19 and shaft 67.

The conveyor 60 includes side guide and frame members 70 on which the guide chute 62 is mounted, and which also supports the rollers for the conveyor belt 64. The frame 70 is mounted with suitable braces 71 to a box 72 that includes a bottom wall, upstanding side walls attached to the bottom wall and a front wall joining the side walls. The box 72 is pivotally mounted as at 73 to the rear portions of the frame members 12A with suitable brackets 74. The box 72 and conveyor member 60 are thus a single unit and movement about pivot 73 is controlled by a pair of hydraulic cylinders 75 that are mounted as at 76 to opposite ends of the cross member 40, at the outer ends thereof. The rods for cylinders 75 are pivotally attached to frame members 77 that in turn are fixed to the side walls of the box 72.

The box 72 has an automatic end gate for closing the rear end opening between the side walls, although a manually operable end gate could also be used. This end gate is perhaps best shown in FIG. 3 and comprises a rear panel 80 mounted on a pair of arms 81,81 positioned on opposite sides of the panel. The arms 81,81 are pivotally mounted as at 82 to the side walls of the box. Cable control members 83 pass over separate pulleys rotatably mounted at the top of each of the frameworks 77. The cables attach back to the lower pins at 76 for the cylinders 75. When the box 72 is in its down position, the cables 83 are of length to permit the end gate assembly 80 to move to its lowered position closing off the rear opening of the box 72, and when the box 72 is tilted to its position in FIG. 3 the cylindrical action causes the cables 83 to pull on the end gate 80 through the arms 81 and pivot 82 and lift the end gate to its open position. The movement of the end gate is because of the relative movement of the pulleys on supports 77 with respect to the lower pins for cylinders 75.

Also, it can be seen that the telescoping U jointed shaft 66 (there are universal joints at opposite ends thereof) passes from the end of shaft 19, between framework elements to the shaft 67 and collapses to the length shown in FIGS. 1 and 2 when the box 72 is in its down position. The shaft 66 is of sufficient length to extend to permit the box 72 to go to its dumped position shown in FIG. 3.

In operation the rock picker is moved along the ground to pick up a windrow 25 of rocks, which are then moved up the conveyor 22, into the tumbler or cage 34. The rotating tumbler removes dirt as the rocks move rearwardly and the rocks then move into the chute 62, and are carried up the conveyor 60 by belt 64. The conveyor belt 64 will be driven from the power take off 16 through the shafts previously described and the rocks will be dropped into the box 72. When the box 72 is filled with rocks, the picker is moved to a waiting truck or other place for dumping, and the cylinders 52 are extended under fluid pressure from a pressure source, which can be mounted on support 20, to raise the rear portions of the frame upwardly as shown in FIG. 3 (FIG. 3 is not fully raised, and can be raised more) and then the cylinders 75 are also operated to tilt the box 72, causing the gate 80 to open and the rocks to come out from the gate and fall onto a waiting truck bed or other conveyor for movement of a larger load of rocks to a place where they will be left. The dumping is quick, and the balance point of the picker not shifted appreciably because of the length of the torque arms 47. The pivot for the arms is a substantially distance ahead of the wheels 45. It should be noted that the torque arms are positioned so that the wheels move less than 45° of arc to their raised position, and actually as shown move approximately 30° of arc to a substantially fully raised position. The hitch 14 has sufficient play in it so that the end of the frame 11 will pivot about the pin in the hitch, to permit the unit to move as shown in FIG. 3.

The long torque arms and restriction of balance point shift makes operation safe. With the box 72 full of rocks shifting the balance point forwardly a great distance could cause the hitch to lift up and this could be dangerous. The restricted travel (30°) of the torque arms from a nearly horizontal position to full raised position insures little shift in balance point of the wheels with respect to the center of gravity of the picker.

The hydraulic cylinder on both the lift device and dump box act directly to support the loads and remain stable. The torque arms are substantially horizontal when in the frame lowered position as shown.

In the 30° travel of the torque arm shown, the end of the box will be high enough to clear most truck beds, for example 5 to 6 feet off the ground.

What is claimed is:

1. In a rock picker having a conveyor for elevating rocks from the ground, and a rotatable tumbler for removal of foreign material from the rocks, the improvement comprising a frame mounting said conveyor and tumbler and extending rearwardly therefrom, a storage box mounted to the rear portions of said frame to the rear of said tumbler, a second conveyor assembly fixed to the forward end of said storage box and substantially centered in transverse direction on said box and having an inlet end positioned closely adjacent the rear of said tumbler in a first box position, means to pivotally mount a rear portion of said box to the rear portion of said frame, and hydraulic cylinder means to pivot said box and said conveyor from position adjacent said tumbler to a dumping position.

2. The combination as specified in claim 1 and means to support said elongated frame for movement along the ground comprising a wheel assembly, including torque arm means pivotally mounted to said frame, wheel means at the opposite end of said torque arm means, said wheel means being located longitudinally between the front and rear ends of the frame, and second hydraulic cylinder means connected to said torque arm means closely adjacent said wheel means and connected to said frame to selectively exert a lifting force between the wheel means and the frame, which force substantially directly lifts said frame, said torque arms pivoting about their pivotal mounting to said frame as the frame is lifted with respect to said wheel means a preselected amount.

3. The combination as specified in claim 2 wherein wheels are mounted on axles, and said torque arm means are of sufficient length so that said wheels do not move significantly in longitudinal direction of said frame when said cylinders are operated to raise said frame.

4. The combination as specified in claim 3 wherein said frame reaches a fully raised position with respect to said wheel means before said torque arm means has traveled substantially 45° of arc.

5. The combination as specified in claim 4 and power drive means to said conveyor means comprising a elongated telescoping shaft having universal joints at opposite ends thereof, said telescoping shaft being of sufficient length to permit moving said box to its dumping position without disengaging said shaft.

6. In a rock picker having a frame with front and rear portions and means for lifting rocks from the ground and moving them rearwardly on the frame, the improvement comprising a storage box mounted to the rear portions of said frame to receive rocks from said means for lifting rocks in a first box position, a conveyor assembly associated with the forward end of said storage box, means to pivotally mount a rear portion of said box to the rear portions of said frame, first hydraulic cylinder means to pivot said box from the first box position to a dumping position, and means to support said frame for movement along the ground comprising a wheel assembly, including torque arm means pivotally mounted to said frame, wheel means at the opposite ends of said torque arm means, and second hydraulic cylinder means connected to said torque arm means adjacent said wheels and connected to said frame substantially directly above the connection thereof to said torque arms, and operable to directly lift said frame relative said wheel means as the torque arms pivot about their pivotal mounting to said frame.

7. In a rock picker having a frame with front and rear portions and means for lifting rocks from the ground and moving them rearwardly on the frame, the improvement comprising a frame to receive rocks from said means for lifting rocks in a first box position, a conveyor assembly associated with the forward end of said storage box, means to pivotally mount a rear portion of said box to the rear portions of said frame, first hydraulic cylinder means to pivot said box from the first box position to a dumping position, and means to support said frame for movement along the ground comprising a wheel assembly including torque arm means pivotally mounted to said frame, wheel means at the opposite ends of said torque arm means, and second hydraulic cylinder means connected to said torque arm means adjacent said wheel means and connected to said frame substantially directly above the connection thereof to said torque arm means and operable to directly lift said frame relative said wheel means as the torque arm means pivot about its pivotal mounting to said frame.

* * * * *

PO-1050
(5/69)

UNITED STATES PATENT OFFICE
CERTIFICATE OF CORRECTION

Patent No. 3,782,477      Dated January 1, 1974

Inventor(s) Harley D. Fahrenholz

It is certified that error appears in the above-identified patent and that said Letters Patent are hereby corrected as shown below:

Cancel Patent Claim 6, i.e. Column 6, cancel line 19 commencing "6. In a rock picker" -- through 39 -- ending with "mounting to said frame". (Claim 6 in Column 6, line 43, Claim 7, line 4), after "a" insert--storage box mounted to the rear portion of said--. Column 6, line 40, "7." should read -- 6. --.

Signed and sealed this 21st day of May 1974.

(SEAL)
Attest:

EDWARD M. FLETCHER, JR.
Attesting Officer

C. MARSHALL DANN
Commissioner of Patents